United States Patent
Cuffaro et al.

(10) Patent No.: US 7,787,366 B2
(45) Date of Patent: Aug. 31, 2010

(54) METHOD AND APPARATUS FOR CONTROLLING WIRELESS MEDIUM CONGESTION BY ADJUSTING CONTENTION WINDOW SIZE AND DISASSOCIATING SELECTED MOBILE STATIONS

(75) Inventors: Angelo Cuffaro, Laval (CA); Ahmed Ali, Ottawa (CA)

(73) Assignee: InterDigital Technology Corporation, Wilmington, DE (US)

( * ) Notice: Subject to any disclaimer, the term of this patent is extended or adjusted under 35 U.S.C. 154(b) by 1000 days.

(21) Appl. No.: 11/263,291

(22) Filed: Oct. 31, 2005

(65) Prior Publication Data

US 2006/0187840 A1 Aug. 24, 2006

Related U.S. Application Data

(60) Provisional application No. 60/649,454, filed on Feb. 2, 2005.

(51) Int. Cl.
   *H04W 28/02* (2009.01)
   *H04J 1/16* (2006.01)
(52) U.S. Cl. .................... 370/229; 370/235; 370/329
(58) Field of Classification Search ............. 370/229, 370/230.1, 235, 236, 277, 282, 310.2, 328, 370/329
   See application file for complete search history.

(56) References Cited

U.S. PATENT DOCUMENTS

| | | | |
|---|---|---|---|
| 6,128,506 A | 10/2000 | Knutsson et al. | |
| 6,192,032 B1 | 2/2001 | Izquierdo | |
| 6,226,277 B1 * | 5/2001 | Chuah | 370/328 |
| 6,327,254 B1 * | 12/2001 | Chuah | 370/328 |
| 6,469,991 B1 * | 10/2002 | Chuah | 370/329 |
| 7,024,201 B2 | 4/2006 | Tomishima et al. | |
| 7,194,000 B2 * | 3/2007 | Balachandran et al. | 370/395.42 |

(Continued)

FOREIGN PATENT DOCUMENTS

JP    2003-244161    8/2003

(Continued)

OTHER PUBLICATIONS

Choi et al, IEEE 802.11e Contention-Based Channel Access (EDCF) Performance Evaluation; IEEE 2003, pp. 1151-1156.*

(Continued)

*Primary Examiner*—Chi H Pham
*Assistant Examiner*—Ahmed Elallam
(74) *Attorney, Agent, or Firm*—Volpe and Koenig, P.C.

(57) ABSTRACT

A method and apparatus for alleviating congestion of a wireless medium used by an access point (AP) and a plurality of wireless transmit/receive units (WTRUs) is disclosed. If congestion is determined to exist on the wireless medium, a determination is then made as to whether there are any low priority traffic streams established between the AP and at least one of the WTRUs. If there are no low priority traffic streams established between the AP and at least one of the WTRUs, selected ones of the associated WTRUs are disassociated with the AP based on the amount of time spent by the WTRUs trying to transmit and retransmit unacknowledged packets or on a specific traffic stream access category. If low priority traffic streams have been established, the packet transmission delay associated with the low priority traffic streams is increased when congestion exists. Otherwise, the packet transmission delay is decreased.

20 Claims, 3 Drawing Sheets

U.S. PATENT DOCUMENTS

| | | | |
|---|---|---|---|
| 7,366,149 B2 | 4/2008 | Maki et al. | |
| 2001/0036157 A1* | 11/2001 | Blanc et al. | 370/235 |
| 2001/0051992 A1* | 12/2001 | Yang et al. | 709/207 |
| 2002/0163933 A1* | 11/2002 | Benveniste | 370/465 |
| 2003/0214928 A1* | 11/2003 | Chuah | 370/336 |
| 2004/0090943 A1 | 5/2004 | Da Costa et al. | |
| 2004/0196864 A1* | 10/2004 | Benveniste | 370/462 |
| 2005/0018617 A1* | 1/2005 | Jin et al. | 370/252 |
| 2005/0025167 A1* | 2/2005 | Ishibashi et al. | 370/412 |
| 2005/0030890 A1* | 2/2005 | Benco et al. | 370/229 |
| 2005/0036448 A1* | 2/2005 | Leeuwen | 370/235 |
| 2005/0052995 A1* | 3/2005 | Gu et al. | 370/230 |
| 2005/0058151 A1* | 3/2005 | Yeh | 370/445 |
| 2005/0100022 A1* | 5/2005 | Ramprashad | 370/395.42 |
| 2005/0136833 A1 | 6/2005 | Emeott et al. | |
| 2005/0147041 A1 | 7/2005 | Zaki et al. | |
| 2005/0157676 A1* | 7/2005 | Kwak et al. | 370/328 |
| 2005/0197148 A1 | 9/2005 | Ali et al. | |
| 2005/0270977 A1* | 12/2005 | King et al. | 370/235 |
| 2005/0281243 A1* | 12/2005 | Horn et al. | 370/345 |
| 2006/0034219 A1* | 2/2006 | Gu et al. | 370/329 |
| 2006/0039333 A1* | 2/2006 | Pirzada et al. | 370/338 |
| 2006/0092845 A1* | 5/2006 | Kwan et al. | 370/235 |
| 2006/0112168 A1* | 5/2006 | Albers et al. | 709/213 |
| 2006/0126581 A1 | 6/2006 | Katsumata et al. | |
| 2006/0140112 A1* | 6/2006 | Ginzburg | 370/229 |
| 2006/0140186 A1* | 6/2006 | LoGalbo et al. | 370/390 |
| 2007/0047570 A1* | 3/2007 | Benveniste | 370/448 |
| 2008/0095124 A1* | 4/2008 | Ramos et al. | 370/336 |

FOREIGN PATENT DOCUMENTS

| | | |
|---|---|---|
| JP | 2004-200735 | 7/2004 |
| JP | 2005-130069 | 5/2005 |
| WO | 02/054671 | 7/2002 |

OTHER PUBLICATIONS

Chou et al., "Inter-frame Space (IFS) Based Service Differentiation for IEEE 802.11 Wireless LANs," IEEE 58th Vehicular Technology Conference, vol. 3, pp. 1412-1416 (Oct. 6-9, 2003).

Aad et al., "Differentiation Mechanisms for IEEE 802.11," IEEE INFOCOM Proceedings, pp. 209-218 (Apr. 2001).

Kong et al., "Performance Analysis of IEEE 802.11e Contention-Based Channel Access," IEEE Journal on Selected Areas in Communications, vol. 22, No. 10, pp. 2095-2106 (Dec. 2004).

* cited by examiner

300

METHOD AND APPARATUS FOR CONTROLLING WIRELESS MEDIUM CONGESTION BY ADJUSTING CONTENTION WINDOW SIZE AND DISASSOCIATING SELECTED MOBILE STATIONS

CROSS REFERENCE TO RELATED APPLICATION

This application claims the benefit of U.S. Provisional Patent Application 60/649,454 filed on Feb. 2, 2005, which is incorporated by reference as if fully set forth.

FIELD OF INVENTION

The present invention is related to reducing congestion in a wireless communication system, (e.g., a wireless local area network (WLAN)), including a plurality of wireless transmit/receive units (WTRUs), (i.e., mobile stations), and an access point (AP). More particularly, the present invention is related to adjusting the length of a delay between packets, (i.e., packet transmission delay), transmitted over a wireless medium shared by the AP and the WTRUs, as controlled through enhanced distributed channel access (EDCA) parameters used for setting up for a contention window and an arbitration inter-frame space (AIFS) and, if deemed necessary, selectively disassociating some of the WTRUs from the system.

BACKGROUND

The 802.11e specification, approved by the Institute of Electrical and Electronics Engineers (IEEE) in late 2005, defines quality of service (QoS) mechanisms for WTRUs which support bandwidth-sensitive applications such as voice and video. The original IEEE 802.11 media access control (MAC) protocol which defines two different access methods, the distributed coordination function (DCF) and the point coordination function (PCF). The DCF is basically a carrier sense multiple access with collision avoidance mechanism (CSMA/CA). CSMA protocols are well known in the industry, where the most popular is the Ethernet, which is a CSMA/collision detection (CD) protocol. Using the CSMA protocol, an AP or WTRU desiring to transmit senses the medium, if the medium is busy, (i.e., some other WTRU or AP is transmitting), and then the AP or WTRU will defer its transmission to a later time when the medium is sensed as being free. These types of protocols are very effective when the medium is not heavily loaded, since it allows stations to transmit with minimum delay, but there is always a chance of stations transmitting at the same time (collision), caused by the fact that the stations sensed the medium free and decided to transmit at once.

These collision situations must be identified, so the MAC layer can retransmit the packet by itself and not by upper layers, which would cause significant delay. In the Ethernet case, this collision is recognized by the transmitting stations which go to a retransmission phase based on an exponential random backoff algorithm.

While these collision detection mechanisms are a good idea on a wired LAN, they cannot be used on a wireless LAN environment, because implementing a collision detection mechanism would require the implementation of a full duplex radio, capable of transmitting and receiving at once, an approach that would increase the price significantly. Furthermore, on a wireless environment, it cannot be assumed that all stations hear each other, (which is the basic assumption of the collision detection scheme), and the fact that a station willing to transmit and senses the medium free, does not necessarily mean that the medium is free around the receiver area.

In order to overcome these problems, the IEEE 802.11 uses a collision avoidance mechanism together with a positive acknowledge scheme. A station willing to transmit senses the medium. If the medium is busy, it then defers. If the medium is free for a specified time, (called Distributed Inter Frame Space (DIFS), in the standard), then the station is allowed to transmit, the receiving station will perform a cyclic redundancy check (CRC) of the received packet and send an acknowledgement packet (ACK). Receipt of the acknowledgment will indicate to the transmitter that no collision occurred. If the sender does not receive the acknowledgment, then it will retransmit the fragment until it gets acknowledged or thrown away after a given number of retransmissions.

In order to reduce the probability of two stations colliding because they cannot hear each other, the standard defines a Virtual Carrier Sense mechanism. A station willing to transmit a packet will first transmit a short control packet called Request To Send (RTS), which will include the source, destination, and the duration of the following transaction, (i.e., the packet and the respective ACK), the destination station will respond (if the medium is free) with a response control Packet called Clear to Send (CTS), which will include the same duration information.

All stations receiving either the RTS and/or the CTS, will set their Virtual Carrier Sense indicator, (called Network Allocation Vector (NAV)), for the given duration, and will use this information together with the Physical Carrier Sense when sensing the medium. This mechanism reduces the probability of a collision on the receiver area by a station that is "hidden" from the transmitter, to the short duration of the RTS transmission, because the station will hear the CTS and "reserve" the medium as busy until the end of the transaction. The duration information on the RTS also protects the transmitter area from collisions during the ACK, (by stations that are out of range from the acknowledging station).

It should also be noted that because of the fact that the RTS and CTS are short frames, it also reduces the overhead of collisions, since these are recognized faster than it would be recognized if the whole packet was to be transmitted, (this is true if the packet is significantly bigger than the RTS, so the standard allows for short packets to be transmitted without the RTS/CTS transaction, and this is controlled per station by a parameter called RTS Threshold).

The Standard defines four (4) different types of Inter Frame Spaces, which are used to provide different priorities.

A Short Inter Frame Space (SIFS) is used to separate transmissions belonging to a single dialog, (e.g., Fragment-ACK), and is the minimum Inter Frame Space. There is always at most one single station to transmit at this given time, hence having priority over all other stations.

A Point Coordination IFS (PIFS) is used by the AP (or Point Coordinator, as called in this case), to gain access to the medium before any other station.

A Distributed IFS (DIFS) is the Inter Frame Space used for a station willing to start a new transmission, which is calculated as PIFS plus one slot time, i.e. 128 microseconds.

An Extended IFS (EIFS) is a longer IFS used by a station that has received a packet that could not be understood. This is needed to prevent the station (who could not understand the duration information for the Virtual Carrier Sense) from colliding with a future packet belonging to the current dialog.

Backoff is a well known method to resolve contention between different stations willing to access the medium, the method requires each station to choose a Random Number (n) between 0 and a given number, and wait for this number of slots before accessing the medium, always checking whether a different station has accessed the medium before.

The slot time is defined in such a way that a station will always be capable of determining if another station has accessed the medium at the beginning of the previous slot. This reduces the collision probability by half.

Exponential backoff occurs each time the station chooses a slot and happens to collide whereby the station will increase the maximum number for the random selection exponentially. An exponential backoff algorithm must be executed when the station senses the medium before the first transmission of a packet, and the medium is busy, after each retransmission, and after a successful transmission. The only case when this mechanism is not used is when the station decides to transmit a new packet and the medium has been free from more than DIFS.

EDCA introduces the concept of traffic categories. Each WTRU has four traffic categories, or priority levels. Using EDCA, the WTRUs try to send data after detecting that the medium is idle and after waiting a period of time defined by the corresponding traffic category, called the AIFS. A higher-priority traffic category has a shorter AIFS than a lower-priority traffic category. Thus, WTRUs with lower-priority traffic must wait longer than those with high-priority traffic before trying to access the medium. This is fixed per access category and is a very short duration of time.

To avoid collisions within a traffic category, the WTRU counts down an additional random number of time slots, known as a contention window, before attempting to transmit data. This can also be defined per access category. If another WTRU transmits before the countdown has ended, the WTRU waits for the next idle period, after which it continues the countdown where it left off. No guarantees of service are provided, but EDCA establishes a probabilistic priority mechanism to allocate bandwidth based on traffic categories.

In a WLAN that is compliant with the IEEE 802.11e specification, different types of traffic are mapped into corresponding access categories with corresponding priorities. Each access category has a different minimum contention window size and a maximum contention window size which reflect the priority of that category, as compared to an 802.1a/b/g WLAN network. The contention window size refers to the delay between packet transmissions. As the contention window size changes, so does the AIFS in a proportional manner.

As different traffic users contend for access to a channel, the different minimum contention window size provide a clear advantage for higher priority access categories over the lower priority access categories. However, the WLAN is not prevented from reaching a congested state, and the WLAN does not have a mechanism to control congestion once it arises.

Since an increase in the number of users associated with any access category results in an increase in the number of collisions and a corresponding increase in packet error rate (PER), the system would inevitably be driven into a congested state.

SUMMARY

The present invention is related to a method and apparatus for alleviating congestion of a wireless medium used by an AP and a plurality of WTRUs is disclosed. If congestion is determined to exist on the wireless medium, a determination is then made as to whether there are any low priority traffic streams established between the AP and at least one of the WTRUs. If there are no low priority traffic streams established between the AP and at least one of the WTRUs, selected ones of the associated WTRUs are disassociated with the AP based on the amount of time spent by the WTRUs trying to transmit and retransmit unacknowledged packets or on a specific traffic stream access category. If low priority traffic streams have been established, the packet transmission delay associated with the low priority traffic streams is increased when congestion exists. Otherwise, the packet transmission delay is decreased.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENT(S)

Hereafter, the term "WTRU" includes, but is not limited to, a user equipment (UE), a fixed or mobile subscriber unit, a pager, or any other type of device capable of operating in a wireless environment. When referred to hereafter, the term "AP" includes, but is not limited to, a base station, a Node-B, a site controller, or any other type of interfacing device in a wireless environment.

The present invention is applicable to all WLANs, personal area networks (PANs), and metropolitan area networks (MANs), but in particular to 802.11-based WLANs.

In a WLAN, it is possible to have many stations attempting to transmit data simultaneously. When several stations are attempting to transmit at the same time, collisions may occur between data packets and a greater number of errors will occur, requiring information to be resent. Very quickly, a few collisions and errors can cause a large backlog of data waiting to be transmitted. For some types of data, such as an email or a text message, a small delay on the network will not be noticed by the user. However, for voice or data transmission, any delay can frustrate the user, and even render the network useless for their purposes. For these reasons, different types of data have been assigned to different access categories.

Figure 1:
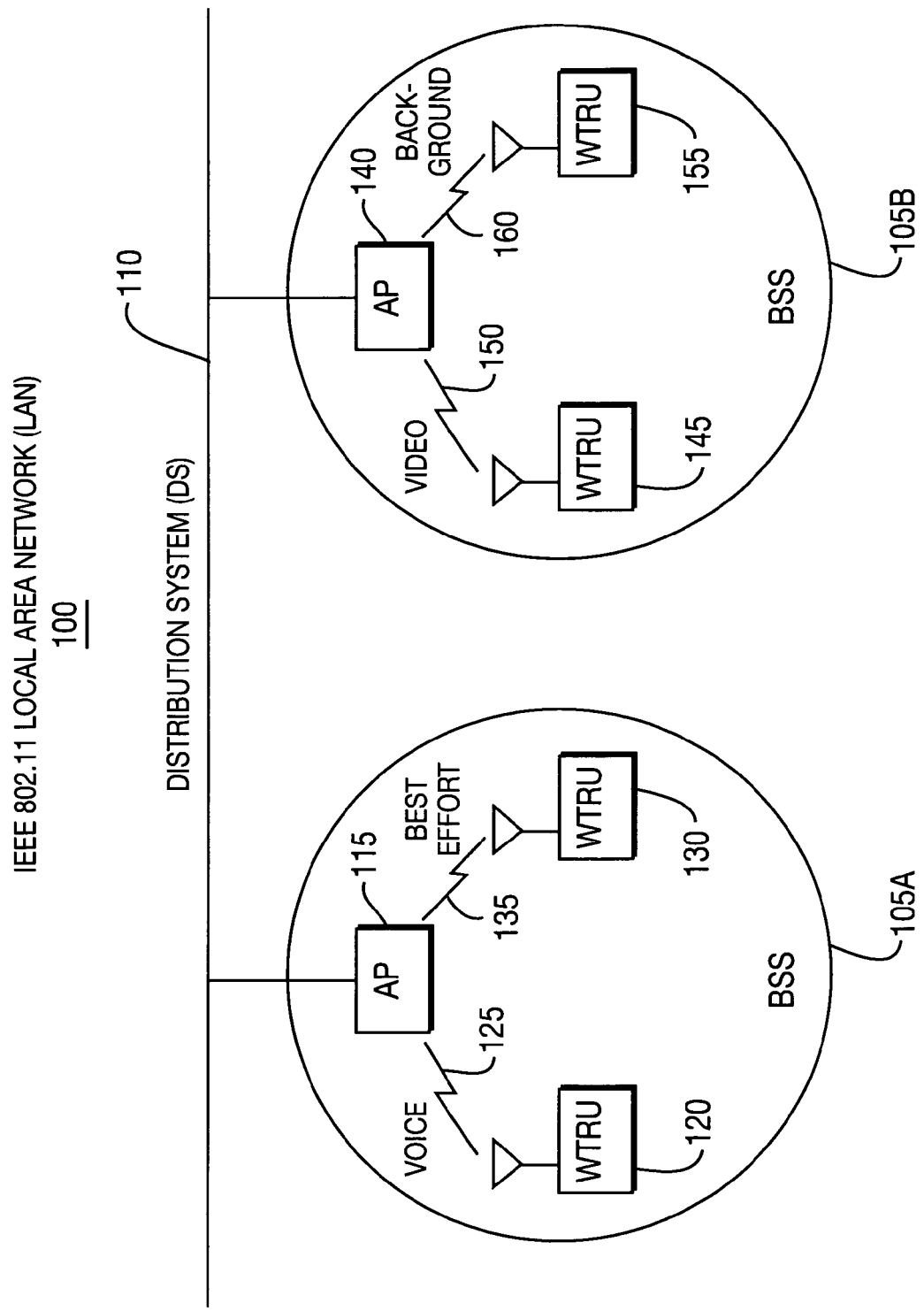
FIG. 1 shows an exemplary IEEE 802.11 local area network (LAN) in which the present invention is implemented in accordance with the present invention.

FIG. 1 shows an exemplary IEEE 802.11 LAN 100 having a cellular architecture including a plurality of basic service sets (BSSs) 105A, 105B, (i.e., cells), connected to a common distribution system (DS) 110. In this example, the BSS 105A includes an AP which communicates with a WTRU 120 via a voice access category traffic stream 125, and with a WTRU 130 via a best effort access category traffic stream 135. The BSS 105B includes an AP 140 which communicates with a WTRU 145 via a video access category traffic stream 150, and with a WTRU 155 via a background access category traffic stream 160.

The voice access category traffic stream 125 relates to a real-time conversation. A voice access category is characterized by the fact that the end-to-end delay is low and the traffic is symmetric or nearly symmetric. The voice access category is the most time critical data to transmit, and can be characterized as requiring less than a 10 ms delay. With the growing popularity of voice over Internet phone (VoIP) technology, it becomes increasingly more important for these data packets to be able to transmit without any delay.

The best effort access category traffic stream 135 relates to web browsing, database retrieval and server access. The best effort access category is characterized by the request/response pattern of an end-user. The best effort access category is designated for traditional LAN traffic such as emails, or text messages. The best effort access category is not time critical, and, in most cases, a small delay in transmission will go unnoticed by the user.

The video access category traffic stream 150 relates to a multi-media streaming technique for transferring data such that it can be processed as a steady and continuous stream. The video access category is the second most time critical data to transmit, and can be characterized as requiring less than a 100 ms delay. Similar to voice, if an interactive video transmission is delayed, the advantages of a wireless network will not be realized by the user.

The background access category traffic stream 160 relates to data traffic of applications such as e-mail delivery, short messaging service (SMS), downloading of databases, and reception of measurement records. The delay may be seconds, tens of seconds or even minutes. The background access category is characterized by the fact that the destination is not expecting the data within a certain time. The background access category is designated for non-time critical or loss sensitive data. A background traffic stream generally has a lower priority than a best effort traffic stream, and would include bulk data transfers and other activities that are permitted on the network, but should not impact the use of the network by other users and applications. Traditionally, if one user were downloading a large amount of data, a significant portion of the network's resources could be consumed by the flow of that data.

Figure 2:
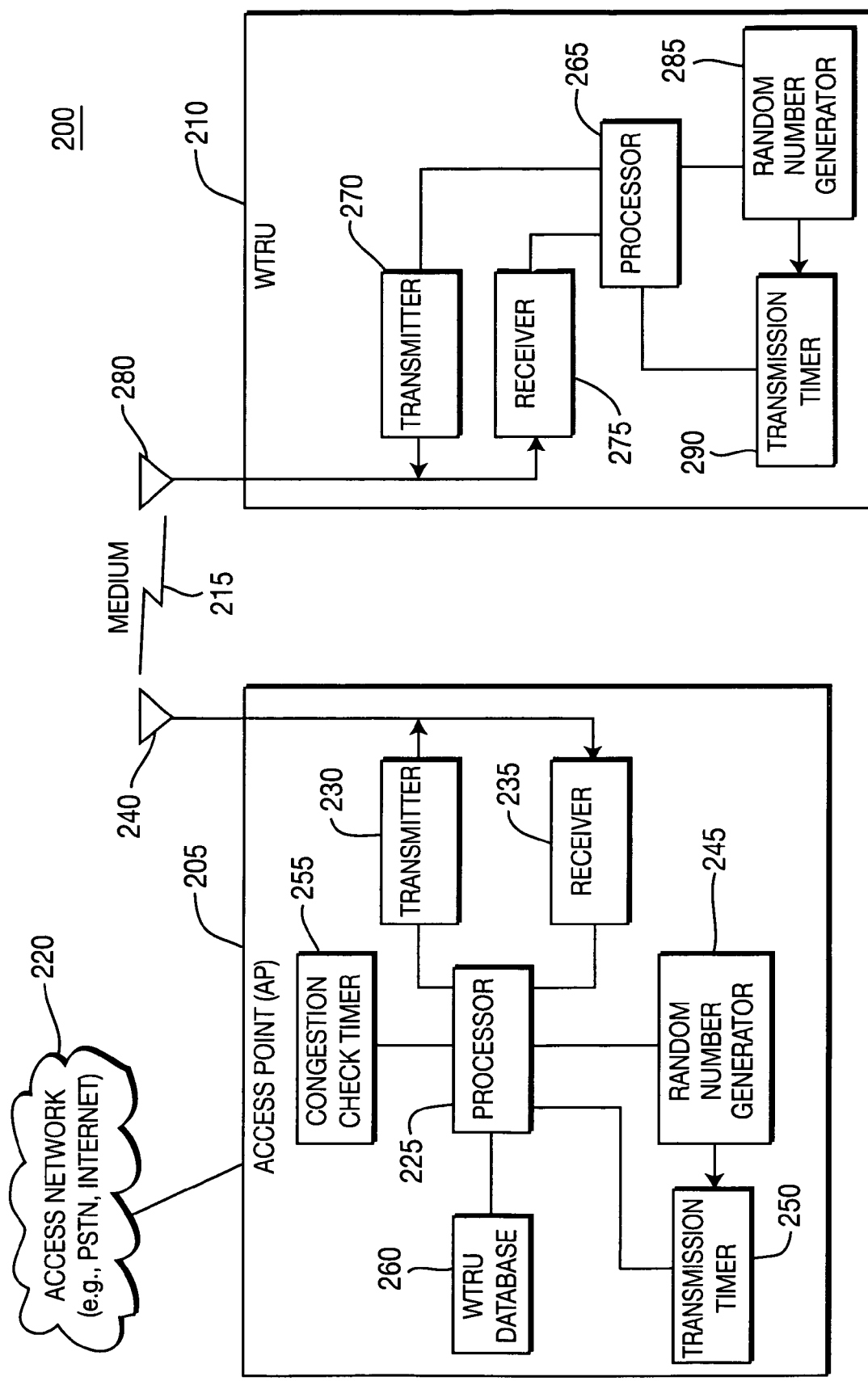
FIG. 2 shows a wireless communication system including an AP which communicates data received from an access network to a WTRU in accordance with the present invention.

FIG. 2 shows a wireless communication system 200 including an AP 205 which communicates with at least one WTRU 210 over a wireless medium 215 in accordance with the present invention. The AP 205 receives data from an access network 220 to send to the WTRU 210. The AP 205 includes a processor 225, a transmitter 230, a receiver 235, an antenna 240, a random number generator 245, a transmission timer 250, a congestion check timer 255 and a WTRU database 260. The WTRU 210 includes a processor 265, a transmitter 270, a receiver 275, an antenna 280, a random number generator 285 and a transmission number 290. The random number generators 245 and 285 define the length of the contention window by outputting a number which corresponds to a number of time units that the timers 250 and 290 will count down from before a packet is transmitted by the transmitters 230 and 270, respectively.

The first part of alleviating congestion on a wireless network is being able to detect a condition where congestion exists. The present invention presents two basic types of metrics for detecting congestion on a wireless network: 1) BSS-based load characterization or "in-BSS" load; and 2) channel-based load characterization; also known as "medium" load.

The in-BSS load metric is primarily dependent upon the load of individual APs. The in-BSS deferral rate is a measure of how much time is spent deferring, when a station has something to transmit, to someone within a station's own BSS. This metric also provides an indication of the current load one particular station is placing in the system. A low value of in-BSS deferral rate could only indicate that the own load is low. Even if there is much in-BSS traffic from the other stations, a station only will defer when it has data to transmit. As a result, the in-BSS deferral metric will be low if a station has little data to transmit. Similarly, a high value for in-BSS deferral rate indicates that there are many nodes transmitting at the same time and that the measuring station has a significant load. However, it is also possible that a high in-BSS could arise where only two nodes in the system are transmitting a lot of data. To address this case, the present invention will also examine the PER. The packet error rate is a good indication of the collision rate. The more nodes in a system, the higher the probability of collision. Both the in-BSS deferral rate and Packet error rate together give a good indication of the own load of an AP. It is also important to average these values over a relatively long period of time, (e.g., 30 seconds).

The present invention provides that congestion is detected where the in-BSS deferral rate is greater than the network's predetermined threshold, and the PER is greater than the network's predetermined threshold over a period of time.

Several alternative metrics are available for measuring in-BSS congestion. For example, the number of associated stations can also be used as an indication that congestion is present. If a significant number of the stations are associated, then it is possible for a network to determine that congestion exists. However, a more precise measure of congestion would compare the number of associated stations against the mean station channel utilization. This would eliminate the possibility of falsely detecting congestion where several stations were each transmitting a small amount of data.

Another BSS metric that can be used to detect congestion is measuring the time delay from when a packet arrives at the AP to the time the AP receives all ACK related to that packet. This is basically measuring the time it takes for data to travel across the BSS and back. The longer it takes, the more congestion that is present on the system.

Yet another BSS metric that can be selected to detect congestion is the average buffer occupancy, or the size of the buffer. Since data waiting to be transmitted is stored usually stored in the buffer of either the STA or the AP than a larger buffer occupancy would indicate more congestion.

Alternatively, a more accurate type of metric for determining congestion is the medium or channel load metric. One way of determining the medium load is by looking at the average duration it takes to execute the backoff procedure. More specifically, this represents the delay incurred from the time the packet is ready for transmission to the time the packet is actually transmitted over the medium. Congestion is determined whenever the average duration an AP or station takes to execute the backoff procedure exceeds a predetermined threshold, set by the network.

Figure 3:
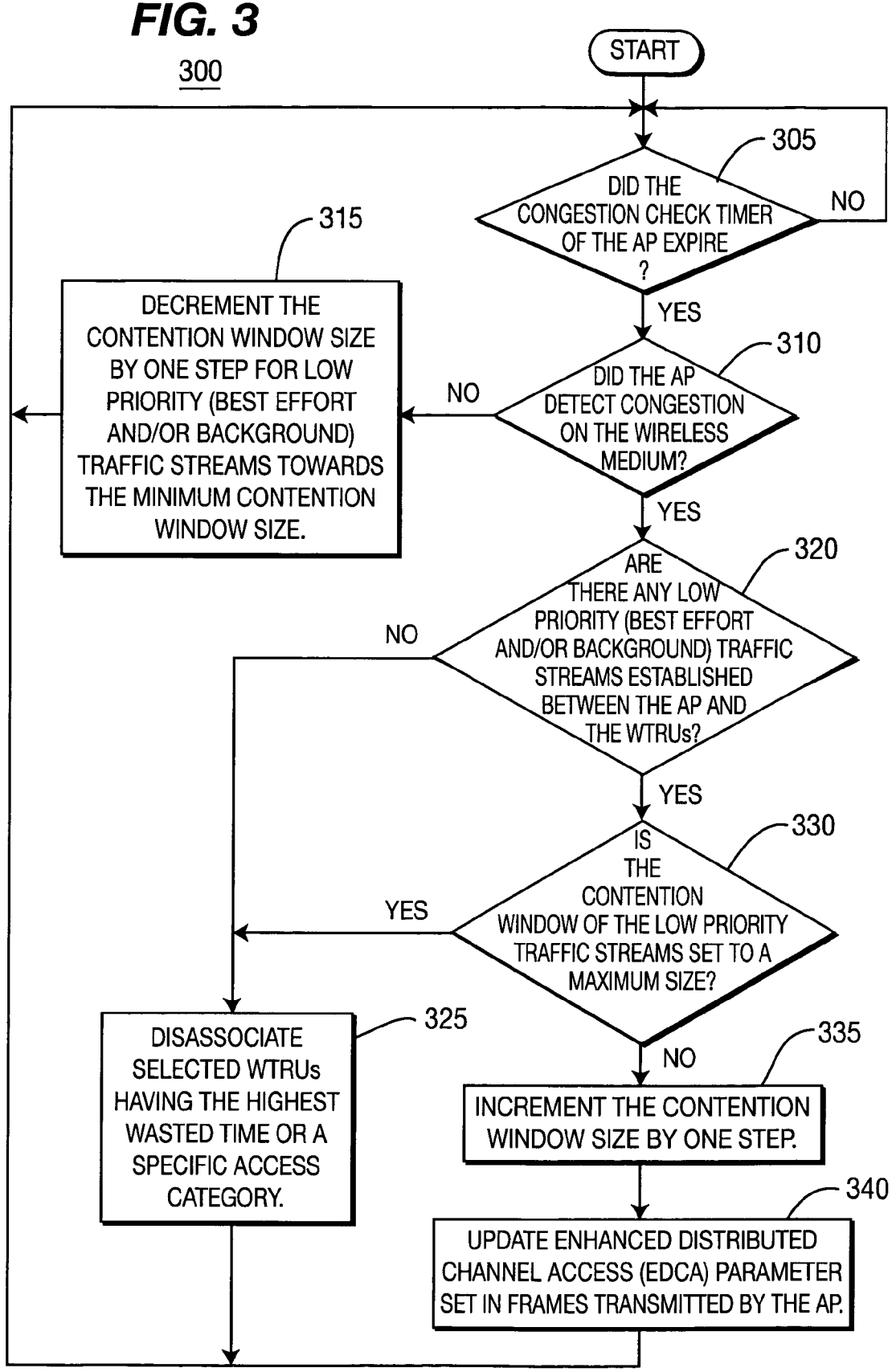
FIG. 3 is a flow diagram of a congestion control algorithm in accordance with the present invention.

FIG. 3 is a flow diagram of a congestion control algorithm 300 in accordance with the present invention. Referring to both FIGS. 2 and 3, when the congestion check timer 255 of the AP 205 expires (step 305), a determination is made by the processor 225 in the AP 205 as to whether there is congestion on the wireless medium 215 (step 310).

If the processor 225 determines at step 310 that congestion does not exist on the wireless medium 215, the size of a contention window, (i.e., a packet transmission delay), associated with low priority traffic streams is decremented by one step, (i.e., the size of the contention window is cut in half, such as from a maximum contention window of 2048 time units to 1024 time units), (step 315). This procedure by be repeated until the contention window size reaches its original, (i.e., minimum), value, (e.g., 32 time units). The low priority traffic streams may include at least one of a best effort access category traffic stream and a background access category traffic stream. In parallel with decrementing the contention window size, the size of the AIFS may also be decreased in step 315.

Still referring to FIGS. 2 and 3, if the processor 225 determines at step 310 that congestion does exist on the wireless medium 215, the processor 225 further determines whether there are any low priority traffic streams established between the AP 205 and at least one of the WTRUs 210 (step 320).

If the processor 225 determines at step 320 that there are no low priority traffic streams established between the AP 205 and at least one of the WTRUs 210, the processor 225 disassociates selected ones of the associated WTRUs listed in the WTRU database 260 based on the amount of time spent by the WTRUs trying to transmit and retransmit unacknowledged packets, or a specific access category (step 325).

If the processor 225 determines at step 320 that there are low priority traffic streams established between the AP 205 and at least one of the WTRUs 210, the processor 225 determines whether the contention window, (i.e., a packet transmission delay), associated with the low priority traffic streams is set to a maximum size, (e.g., 2048 time units), (step 330). If the contention window is not set to the maximum size, the size of the contention window is incremented by one step (step 335) and the processor 225 updates an EDCA parameter set included in frames transmitted by the transmitter 230 (step 340). In parallel with incrementing the contention window size, the size of the AIFS may also be increased in step 335.

If the contention window is set to the maximum size, the algorithm 300 implements step 325.

Incrementing the minimum contention windows of lower priority traffic only affects the deferral rates and consequently reduces the in-BSS congestion, (congestion due to deferrals from WTRUs within the BSS), but for link-based congestion, (where congestion is due to errors in one link only), changing the minimum contention windows will have no effect and therefore it will not be used in this case.

Using any of the above metrics by itself, or in combination, it is also possible to take into account the load of the neighboring APs in assessing whether a WTRU should be disassociated. For example, if the load of the neighboring AP is also high, a user may have a low probability of being served elsewhere.

In accordance with the present invention, the processor 225 of the AP 205 interacts with the WTRU database 260 to sort all WTRUs in the BSS 105 in order of the amount of time spent trying to retransmit. Wasted time is preferably determined in accordance with the wasted time algorithm $ALG_{wt}$ set forth below. More specifically, a set or list of WTRUs with unacknowledged packets is created. For each unacknowledged packet to a WTRU, the sum of all the wasted time spent trying to transmit and re-transmit the packet, (i.e., packet size/packet transmission rate plus a penalty for each retransmitted packet), is recorded. The penalty reflects the increasing delay associated with retransmissions, i.e., the backoff time due to the doubling the size of the contention window. The penalty represents the added delay incurred from the time the packet is ready for transmission to the time the packet is actually transmitted over the medium. This retransmit time metric is therefore much greater for stations wasting time retransmitting packets following collisions. The retransmit time metric is normalized over a selected time period.

An exemplary formula for determining wasted time for a WTRU is given by:

$$\text{wasted\_txtime}_{WTRU} = \sum_{unackPkts} \sum_{i=1}^{\#\_pkts_j} \left( \frac{\text{Pkt\_size}_{ij}}{\text{Pkt\_tx\_rate}_{ij}} + RTx_{i>1} * \text{Penalty} \right)$$

where:
  wasted_time$_{WTRU}$=sum of wasted time spent trying to transmit and retransmit unacknowledged packets to a WTRU
  j=j$^{th}$ packet
  i=i$^{th}$ transmission of j$^{th}$ packet
  #_pkts$_j$=# of transmissions of j$^{th}$ packet, e.g. 1, 2, 3, . . .
  Pkt_size$_{ij}$=size in bits of i$^{th}$ transmission of j$^{th}$ packet
  Pkt_tx_rate$_{ij}$=transmission rate in bps of i$^{th}$ transmission of j$^{th}$ packet
  RTx$_{i>1}$=2$^{i-2}$, for i>1, otherwise 0
  Penalty=CW$_{min}$×slot time, e.g., CW$_{min}$=32 and slot time=20 μs Note: CW will be 2×CW$_{min}$ after first transmission.

Note that #_pkts$_j$ corresponds to the number of unacknowledged transmissions of a given packet. If the packet is eventually successfully transmitted, #_pkts$_j$ corresponds exactly to the number of retransmissions. If the packet is dropped (i.e., never successfully transmitted), #_pkts$_j$ corresponds to (number of retransmissions+1).

An example of the wasted_txtime$_{STA}$ calculation is given below: Assume that an AP has 20 packets to send to a particular WTRU. During the course of the transmissions, the AP monitors and records whether the packet has been successfully acknowledged or not and the number packet re-transmissions as, for example, follows:

GGGGGBBB⇓BBB⇓GGGGG⇑GGGGGG⇑BBB⇓GGGG where:
  ⇑=rate increase,
  ⇓=rate decrease,
  G=acknowledged or "good" frame,
  B=unacknowledged or "bad" frame The 1$^{st}$ B is the sixth packet and there were six transmissions of this sixth (6$^{th}$) packet, i.e., BBB⇓BBB.
  #_pkts$_6$=6
  Pkt_size$_{i6}$=12000 bits
  Pkt_tx_rate$_{i6}$={11.0, 11.0, 11.0, 5.5, 5.5, 5.5} Mbps
  RTx$_{i>1}$*Penalty={0.0, 640.0, 1280.0, 2560.0, 5120.0, 10240.0} us The 7$^{th}$ B is the 17$^{th}$ packet and there were three transmissions of this 17$^{th}$ packet, i.e. ⇑BBB⇓.
  #_pkts$_{17}$=3
  Pkt_size$_{i17}$=8000 bits
  Pkt_tx_rate$_{i17}$={11.0, 11.0, 11.0} Mbps
  RTx$_{i>1}$*Penalty={0.0, 640.0, 1280.0} us Therefore:

wasted_txtime$_{STA}$=(12000/11e6)+(12000/11e6+
    640.0)+(12000/11e6+1280.0)+(12000/5.5e6+
    2560.0)+(12000/5.5e6+5120.0)+(12000/5.5e6+
    10240.0)+(8000/11e6)+(8000/11e6+640.0)+
    (8000/11e6+1280.0)=33.76 ms.

Preferably, the WTRUs are sorted from greatest to smallest times. Each WTRU from the sorted list is disassociated greatest time first, until the congestion is relieved.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method of alleviating congestion in a wireless medium comprising:
   determining, by an access point (AP), whether congestion exists on the wireless medium;
   on a condition that congestion is determined to exist on the wireless medium, determining whether there are any low priority traffic streams established between the AP and at least one wireless transmit/receive unit (WTRU);
   decreasing a packet transmission delay associated with low priority traffic streams on a condition that congestion is determined not to exist on the wireless medium;
   increasing the packet transmission delay associated with the low priority traffic streams on a condition that congestion is determined to exist on the wireless medium; and
   on a condition that there are no low priority traffic streams established between the AP and at least one WTRU, disassociating at least one WTRU based on an amount of time spent by the WTRUs trying to transmit and retransmit unacknowledged packets.

2. The method of claim 1 wherein the low priority traffic streams include a background access category traffic stream.

3. The method of claim 1 wherein the low priority traffic streams include a best effort access category traffic stream.

4. The method of claim 1 further comprising:
   the AP updating an enhanced distributed channel access (EDCA) parameter set included in frames transmitted by the AP.

5. The method of claim 1 wherein the wireless medium is a wireless local area network (WLAN).

6. A method of alleviating congestion in a wireless medium comprising:
   determining, by an access point (AP), whether congestion exists on the wireless medium;
   on a condition that congestion is determined to exist on the wireless medium, determining whether there are any low priority traffic streams established between the AP and at least one WTRU;
   decreasing a packet transmission delay associated with low priority traffic streams on a condition that congestion is determined not to exist on the wireless medium;
   increasing the packet transmission delay associated with the low priority traffic streams on a condition that congestion is determined to exist on the wireless medium; and
   on a condition that there are no low priority traffic streams established between the AP and at least one WTRU, disassociating at least one of the WTRU based on a specific traffic stream access category.

7. The method of claim 6 wherein the low priority traffic streams include a background access category traffic stream.

8. The method of claim 6 wherein the low priority traffic streams include a best effort access category traffic stream.

9. The method of claim 6 further comprising:
   the AP updating an enhanced distributed channel access (EDCA) parameter set included in frames transmitted by the AP.

10. The method of claim 6 wherein the wireless medium is a wireless local area network (WLAN).

11. An access point (AP) comprising:
    a receiver for receiving packets;
    a transmitter for transmitting;
    a processor in communication with the receiver and the transmitter for determining whether congestion exists on a wireless medium; and
    a WTRU database in communication with the processor;
    wherein on a condition that congestion is determined by the processor to exist on the wireless medium, the processor configured to determine whether there are any low priority traffic streams established between the AP and at least one WTRU;
    the processor further configured to decrease a packet transmission delay associated with low priority traffic streams on a condition that congestion is determined not to exist on the wireless medium;
    the processor further configured to increase the packet transmission delay associated with the low priority traffic streams on a condition that congestion is determined to exist on the wireless medium; and
    on a condition that there are no low priority traffic streams established between the AP and at least one WTRU, the processor disassociates at least one WTRU listed in the WTRU database based on an amount of time spent by the WTRUs trying to transmit and retransmit unacknowledged packets.

12. The AP of claim 11 wherein the low priority traffic streams include a background access category traffic stream.

13. The AP of claim 11 wherein the low priority traffic streams include a best effort access category traffic stream.

14. The AP of claim 11 wherein the processor updates an enhanced distributed channel access (EDCA) parameter set included in frames transmitted by the transmitter.

15. The AP of claim 11 wherein the AP operates in a wireless local area network (WLAN).

16. An access point (AP) comprising:
    a receiver for receiving packets transmitted by at least one WTRU over a wireless medium;
    a transmitter for transmitting packets to the at least one WTRU over the wireless medium;
    a processor in communication with the receiver and the transmitter for determining whether congestion exists on the wireless medium; and
    a WTRU database in communication with the processor, wherein on a condition that congestion is determined by the processor to exist on the wireless medium, the processor configured to determine whether there are any low priority traffic streams established between the AP and the at least one WTRU;
    the processor further configured to decrease a packet transmission delay associated with low priority traffic streams on a condition that congestion is determined not to exist on the wireless medium;
    the processor further configured to increase the packet transmission delay associated with the low priority traffic streams on a condition that congestion is determined to exist on the wireless medium; and
    on a condition that there are no low priority traffic streams established between the AP and at least one WTRU, the processor disassociates at least one WTRU listed in the WTRU database based on a specific traffic stream access category.

17. The AP of claim 16 wherein the low priority traffic streams include a background access category traffic stream.

18. The AP of claim 16 wherein the low priority traffic streams include a best effort access category traffic stream.

19. The AP of claim 16 wherein the processor updates an enhanced distributed channel access (EDCA) parameter set included in frames transmitted by the transmitter.

20. The AP of claim 16 wherein the AP operates in a wireless local area network (WLAN).

* * * * *

UNITED STATES PATENT AND TRADEMARK OFFICE
CERTIFICATE OF CORRECTION

| | | |
|---|---|---|
| PATENT NO. | : 7,787,366 B2 | Page 1 of 1 |
| APPLICATION NO. | : 11/263291 | |
| DATED | : August 31, 2010 | |
| INVENTOR(S) | : Cuffaro et al. | |

It is certified that error appears in the above-identified patent and that said Letters Patent is hereby corrected as shown below:

ON THE TITLE PAGE

Item (56), under "FOREIGN PATENT DOCUMENTS", after the line "2005-130069 5/2005", insert line --KR 1999-31807 5/1999--.

IN THE CLAIMS

At claim 6, column 9, line 58, after the word "one", delete "of the".

Signed and Sealed this
Fifth Day of April, 2011

David J. Kappos
*Director of the United States Patent and Trademark Office*